June 1, 1948. L. J. HAMMAN 2,442,357
FISHING ROD HOLDER
Filed July 17, 1946
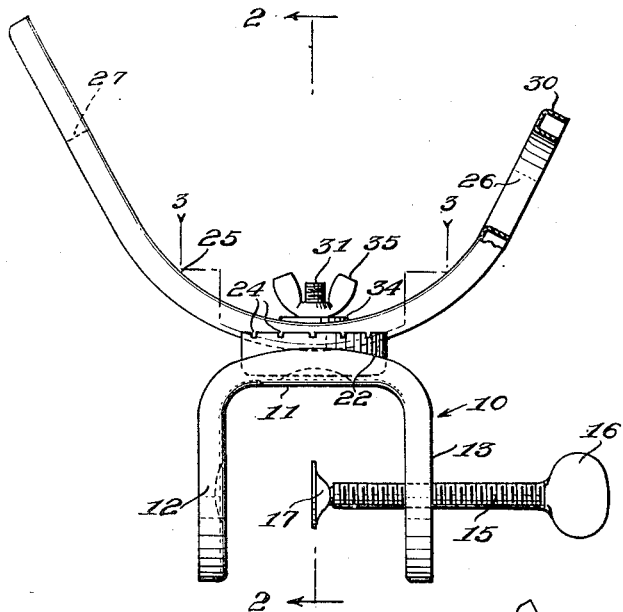
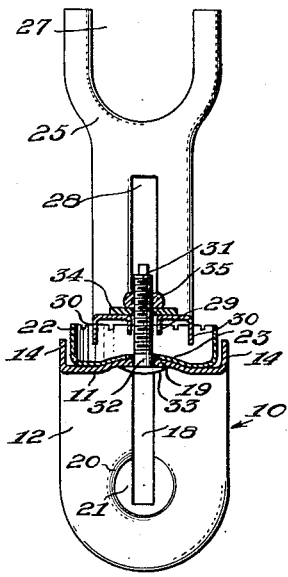
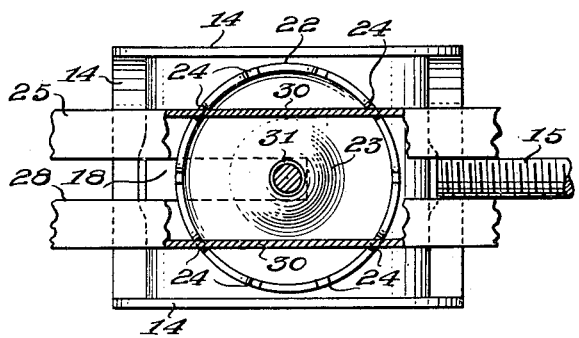
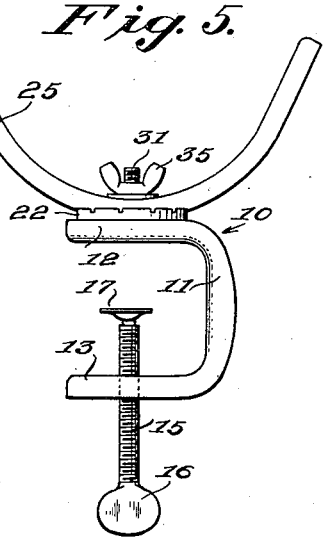
Inventor
Lyle J. Hamman.
By George E. Cook.
Attorney Patented June 1, 1948

2,442,357

UNITED STATES PATENT OFFICE 2,442,357

FISHING ROD HOLDER

Lyle J. Hamman, Eaton Rapids, Mich., assignor to Eaton Stamping Company, Eaton Rapids, Mich., a corporation of Michigan Application July 17, 1946, Serial No. 684,121

2 Claims. (Cl. 248—42)

This invention relates to a rod holder and more particularly to a holder whereby a fishing rod, or the like, may be supported from the gunwale of a boat or other form of support to which it is applicable.

The primary object of the invention is the provision of a rod holder embodying a clamp adapted for attachment to a gunwale, or other desired support, and on which clamp a rod holding bracket is adjustably mounted such that a rod supported by the bracket may be held in various positions.

A further object of the invention is the provision of a rod holder by which a rod may readily be adjusted to various inclined positions, and may also be swung about a vertical axis, and such adjustments are capable of being carried out with a minimum of effort and time.

A still further object of the invention is the provision of a rod holder which is durable, efficient in use and which embodies a minimum number of parts whereby same is capable of manufacture at relatively low cost and which, due to its simplicity, is not as liable to get out of order as the more complex structures heretofore used or proposed.

Other objects and advantages of the invention will present themselves in the course of the following detailed description, taken in connection with the accompanying drawing, wherein:

Fig. 1 is an elevational view of the improved rod holder in accordance with a preferred embodiment thereof.

Fig. 2 is a vertical sectional view in the plane of line 2—2, Fig. 1.

Fig. 3 is an enlarged plan view of the clamp and showing the bracket associated therewith, in section substantially on the line 3—3, Fig. 1.

Fig. 4 is a side elevational view of a washer entering into the rod holder construction.

Fig. 5 is an elevational view similar to Fig. 1 showing an other operative position of the clamp and bracket.

Referring now in detail to the drawing, 10 designates a clamp which is generally of inverted U-form and includes a base 11 and opposed legs 12 and 13. The clamp is preferably constructed of relatively light gauge metal as indicated in Fig. 2, and is provided with a continuous marginal flange 14 for reinforcing same.

The leg 13 of the clamp 10 is provided with a threaded aperture receiving a clamping screw 15 provided with a flat finger engageable head 16 for turning same and a floating clamping head 17 between which and the leg 12 the support is positioned.

The base 11 and leg 12 of the clamp are provided with a slot 18 which terminates in an outset portion 19 in the base and an outset portion 20 in the leg 12.

The outset portions are in the form of a segment of a sphere and each provides a flat seat 21 for a purpose later to appear.

A relatively large cup-shaped metallic washer 22 has its bottom or base inset as at 23 in conformity with the outset portions 19 and 20 in the clamp and the rim of the washer is provided with a plurality of notches 24. The rod holder further includes a curved bracket 25 having a rod receiving aperture 26 at one end and a rod receiving recess 27 at the other end.

Intermediate the aperture 26 and recess 27, the bracket is provided with a slot 28 having an inwardly directed reinforcing flange 29 at each side thereof. The bracket, similarly to the clamp, is provided with a continuous marginal flange 30 which extends as two spaced flanges on opposite sides of the slot 28.

The notches 24 in the washer 22 are so spaced that the flanges 30 seat in a pair thereof at each side of a diameter of the washer as is clearly indicated in Fig. 3.

A bolt 31 is provided with a square shank portion 32 which rests in the clamp slot 18 to prevent turning of the bolt, and the bolt further includes a head 33 having a flat base engageable with either of the flat seats 21.

The bolt extends through the slot 18, washer 22, and slot 28. A washer 34 receives the bolt adjacent its free end and rests on the top of bracket 25, and a thumb nut 35 is applied to the bolt for tightening or loosening same.

In use of the improved holder as above described, a rod is positioned within the bracket aperture 26 and recess 27 which rod will be inclined according to the position of the bracket in Fig. 1. In order to effect more or less inclination of the rod, the thumb nut 35 is loosened and the bracket 25 is shifted diametrically of washer 22 with the flanges 30 riding in notches 24 in the washer.

If it is desired to swing the rod about the axis of bolt 31, the washer 22 with the bracket 25 are swung about such axis upon releasing nut 35.

It is to be particularly noted that the notches 24 provide a positive means to prevent relative rotation between the washer 22 and the bracket 25, and since the entire base of the washer engages a corresponding surface on the clamp, the washer will be retained by friction from turning on the clamp when the thumb nut 35 is tightened. The frictional engagement between the washer and clamp is greatly enhanced by the cooperation of the convex and concave surfaces on the clamp and washer respectively as result from the outset portion on the clamp and inset portion on the washer.

Thus it will be apparent that the present structure is relatively simple in the provision of a single locking washer which is highly effective in maintaining the bracket 25 against rotation on the clamp 10.

Due to the slot 18, the washer 22 and bracket 25 can readily be displaced for seating on the clamp leg 12 as in Fig. 5 since the bolt 31 may be drawn along the slot with the washer 22 and bracket 25 upon loosening nut 35.

The provision for carrying the bracket on the clamp as in Fig. 1 or in Fig. 5 is to adapt the holder to different forms of supports.

While I have disclosed my invention in accordance with a single specific embodiment thereof, such is to be considered as illustrative only, and not restrictive, the scope of the invention being defined in the sub-joined claims.

What I claim and desire to secure by U. S. Letters Patent is:

1. A rod holder comprising a U-shaped clamp including a base and opposed legs, the base having an opening therethrough and being outwardly dished around the opening in the provision of a round convex surface on the outer face of the base, a cup-shaped washer disposed on the clamp and having a centrally apertured circular concave surface on the bottom wall thereof resting upon and cooperating with the convex surface on the clamp base, the edge of the rim portion of the cup-shaped washer being provided with a circumferenctial series of spaced notches, a slotted rod supporting bracket seated on the washer and having spaced parallel flanges on opposite sides of the slot selectively engageable in certain of said notches, a bolt extending through the opening in the base, the aperture in the washer and the slot in the bracket, a washer on the bolt engageable with the bracket on opposite sides of the slot therein, and a nut on the bolt for drawing the cooperating convex and concave surfaces into frictional engagement to hold the washer and bracket in any position about the axis of the bolt and the cooperating notches and flanges providing for movement of the bracket diametrically of the washer upon loosening the nut.

2. The structure according to claim 1 wherein said opening in the base is provided by one end of a slot which extends therefrom to a point adjacent the free end of one of the legs, and a convex surface on the outer wall of said one leg surrounding the adjacent end of the slot for cooperation with the concave surface on the washer which is shiftable from its position on the base to a position on the leg through movement of the bolt along the slot.

LYLE J. HAMMAN.

REFERENCES CITED

The following references are of record in the file of this patent:

UNITED STATES PATENTS

| Number | Name | Date |
| --- | --- | --- |
| 1,278,318 | Edsall | Sept. 10, 1918 |
| 1,992,165 | Bardon | Feb. 26, 1935 |